(Model.)
C. E. HUDSON.
APPLE PARER, CORER, AND SLICER.
No. 260,756.                     Patented July 11, 1882.
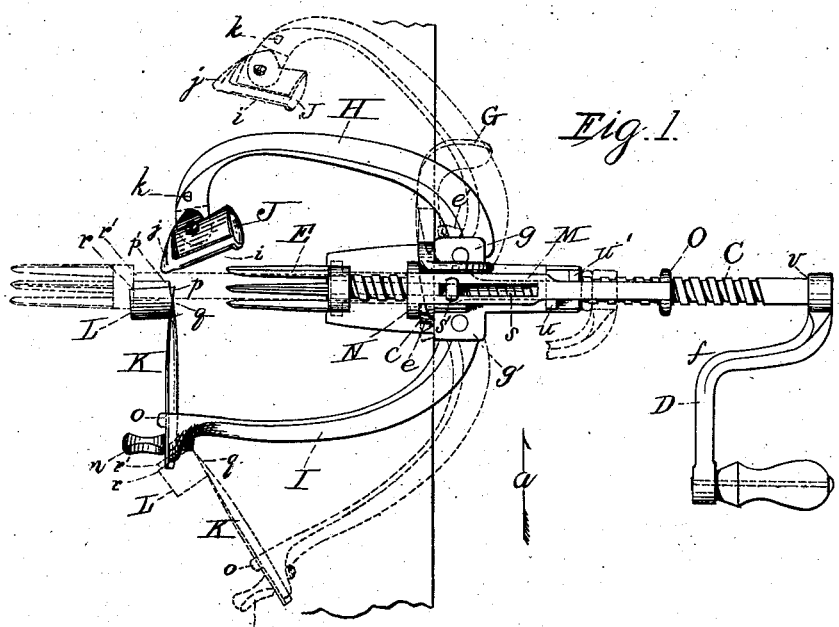
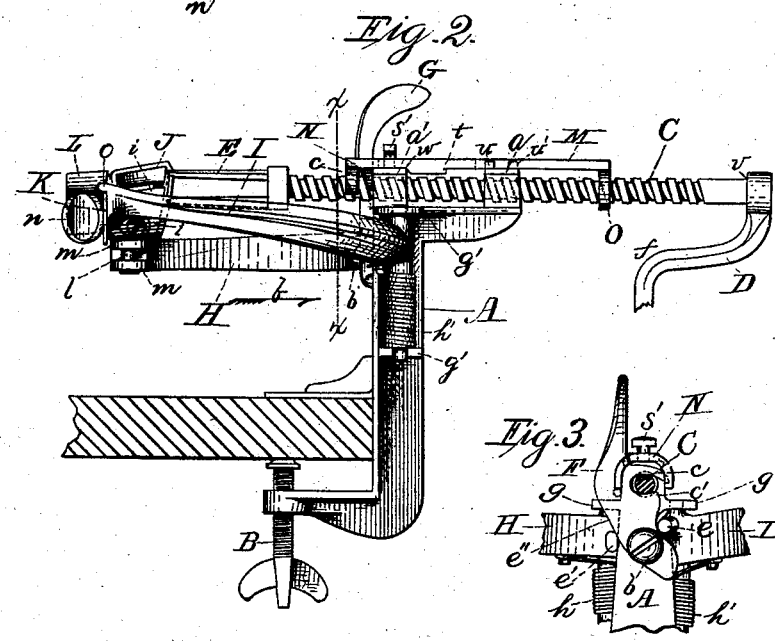
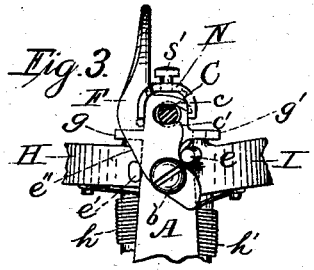
Witnesses;
John C. Dewey.
Edwin E. Moore.
Inventor;
Chas. E. Hudson

UNITED STATES PATENT OFFICE.

CHARLES E. HUDSON, OF LEOMINSTER, MASSACHUSETTS.

APPLE PARER, CORER, AND SLICER.

SPECIFICATION forming part of Letters Patent No. 260,756, dated July 11, 1882.

Application filed March 9, 1882. (Model.)

*To all whom it may concern:*

Be it known that I, CHARLES E. HUDSON, of Leominster, county of Worcester, and State of Massachusetts, have invented certain new and useful Improvements in Apple Parer, Corer, and Slicer Machines; and I do hereby declare that the following is a full, clear, and exact description of the same, reference being had to the accompanying drawings, forming a part of this specification, and in which—

Figure 1 represents a top or plan view of my improved machine, the full lines showing the parts of my machine in position ready to commence the operation of paring, coring, and slicing the apple. The dotted lines show the position of the parts of my machine after the operation upon the apple has been completed. Fig. 2 represents a side view of my machine as shown by full lines, Fig. 1, looking in the direction of arrow $a$ of the same figure; and Fig. 3 represents a section taken on line $x\ x$, Fig. 2, looking in the direction of arrow $b$ of the same figure.

The object of my invention is to support the knives upon hinged horizontal supporting and swinging arms, which are attached to the upright or main part of the machine in such a way that the knives may be carried back out of the way when an apple is placed upon or removed from the holding-fork.

The object of my invention is carried out and obtained by the mechanism and the arrangement of the parts of the machine, in the manner to be described more fully hereinafter.

To enable those skilled in the art to which my invention belongs to make and use the same, I will proceed to describe it more in detail.

In the drawings, the part A represents the upright or frame, having the usual clamp-screw, B, by which it may be fastened or attached to the top of a table or other convenient object.

The part C represents the screw-shaft, mounted in its bearings $a'\ a$ on the upper part of the upright A. These bearings are smooth and not threaded, so that the shaft C may be freely moved either way longitudinally, when desired.

The part D represents the handle or crank for turning the shaft C, and upon the other end of shaft C is the usual fork, E, upon which the apple is placed.

The part F represents what I call a "cam-lever," which is pivoted upon a screw, $b$, upon the upright A, as fully shown in Fig. 3 of the drawings. This cam-lever F is so pivoted at a point upon the upright A as to allow it to engage fully with the thread of the shaft C by means of one or more fingers, $c\ c'$, upon said cam-lever, which, engaging with the thread of the shaft C, act as a nut, through which said shaft C is moved forward by turning the crank or handle D while the fruit is being operated upon, as shown at Fig. 3 of the drawings.

The parts $e\ e'$, Fig. 3, represent two pins upon the movable knife arms or supports, which pins are in contact with the cam-lever F, holding it in position and in contact with the threaded shaft C, so as to engage with the same when the fruit is being operated upon by the knives. The cam-lever F is bent or curved in such a way, as shown at G, Figs. 1 and 2, that the crank D at the point $f$ will come in contact with the bent portion G of said cam-lever when the operation of the knives upon the fruit is completed and the shaft C is in the position shown by dotted lines, Fig. 1. The crank D, coming in contact with the curved part G of the cam-lever F, throws the cam-lever back to its fullest extent, disengaging it from its contact with the threaded shaft C, and at the same time and by the same operation causing the movable knife-supporting arms to be carried back from the fork and take the position shown by dotted lines, Fig. 1; the cam-lever F is held back in position by the pin $e'$ on the supporting-arm of the knife-parer, sliding by the edge $e''$, Fig. 3, of the cam-lever, and coming in contact with a stop-pin upon the inner side of said cam-lever, which has a slight play.

The same effect as above described would be produced if my machine were only used as an apple-parer, with no coring and slicing device and arm supporting the same attached thereto.

The parts H and I represent two movable supports or arms for carrying at their extremities the knife-head J and the corer L and slicer K. Said arms or supports are so hung as to swing in suitable bearings, $g\ g$ and $g'\ g'$, formed upon the upright A, each arm having the usual spring-coil, $h\ h'$, thereto attached, to cause the knives to come in contact with the apple while operated upon. The arms or supports H and I are caused to advance and recede by the movement backward and forward of the cam-lever F, above described. The movable arm H carries at its extremity a swivel knife-head, J, attached to a pin or pivot, to swing or turn in bearings on the end of arm H, as shown in Fig. 2 of the drawings.

The part $i$ represents the knife-blade used in paring the apple. This blade I place upon the inner side of the head J, next to the fruit when operated upon, as shown in Fig. 2. Said knife-blade is attached to the knife-head in the usual manner by a screw passing through a slot in the knife-blade.

The knife-head J is made heavier upon the side $j$, as shown in Fig. 1 of the drawings, so that when the cam-lever F is released from its position, (shown by dotted lines, Fig. 1,) and the knife-head J and supporting-arm H approach the fork E to take the position shown in full lines, Fig. 1, the sudden jar causes the knife-head to come round into the position with the knife-blade facing the fruit to be operated upon, as shown by full lines, Fig. 1. The knife-head may also be caused to turn toward the fruit to be operated upon when the cam-lever F is released by placing the pin $l$ more toward the frame side of the machine in its bearings $m$ $m$ than is shown in the drawings. The pin $k$ on the arm H is a stop-pin to prevent the swivel knife-head J from swinging around too far either way.

The movable arm or support I has at its extremity an adjustable slicing and coring knife, K. This adjustable knife is fastened to the end of the arm I by means of a thumb-screw, $n$. By loosening said thumb-screw the knife K may be dropped down out of the way, and the machine being operated in the same way as above described may be used for paring apples alone. The extremity of the arm I is provided upon its upper side with a projection, $o$, which prevents the knife K, when adjusted and in use, from being carried up out of position by the operation of coring and slicing the apple.

My coring and slicing knife K is made in one piece, the core-cutter L being made in the form of a half-circle extending below and above the edges of the slicing-knife K and at a right angle with said slicing-knife, as shown in Fig. 1 of the drawings.

My core-cutter is made in such a way as to form a long drawing cut, the upper corner, $p$, of the cutting-edge of the corer extending out beyond the lower corner, $p'$, so that it will strike the apple first. This has a tendency to draw the coring knife or cutter toward the fork to its fullest extent, and holds it there firmly, so as to leave a smooth and uniform size of core. The cutting-edge of my core-cutter is upon the edge $q$, toward the main frame of my machine, and not upon the parts $r$ $r'$, as is the case in other machines of this class.

The slicing part of my coring and slicing knife K is made in the form usually used in machines of this class, having its knife or slicing edge upon the edge of the slicer next to the apple operated upon, said slicer being in a position at right angles to the axis of the apple when placed upon the fork E.

The part M represents the "push-off" for the purpose of pushing off from the fork E the apple or core, as the case may require. Said push-off M is made of metal, and is mounted to slide backward and forward longitudinally upon the top of the bearings $a$ $a'$ upon the upper part of the upright A. In this case there is a slot, $s$, along the center of one end of push-off M. A pin, $s'$, projects through this slot, with its head extending over the edges of the slot $s$, so as to prevent the push-off rising out of its place, but allowing it to freely move from one end to the other of the slot $s$ longitudinally, and also allowing it sufficient movement up and down, that it may be raised up out of its notch $t$ when said notch is dropped down over the top edge of the bearing $a'$, allowing the push-off M to be pushed back into the position shown in Fig. 2 of the drawings.

The pin $s'$ is fastened upon the top of the bearing $a'$, and upon the top of bearing $a$ are two projections, $u$ $u'$, between which the push-off M slides backward and forward longitudinally, said projections $u$ $u'$ and the pin $s'$ through the slot $s$ preventing any lateral motion of the push-off. The end N of the push-off is made to partially encircle the fork E.

The under or lower side of the push-off M is made so as to form a notch, $t$, Fig. 2 of the drawings. This notch drops over the top of the front edge of the bearing $a'$ when the push-off is in the position shown by dotted lines, Fig. 1. Said notch holds the push-off in position and prevents its having any longitudinal movement backward while the apple or core, as the case may be, is being pushed off of the fork E.

The operation of my push-off is as follows: The push-off M being in the position shown in full lines, Figs. 1 and 2 of the drawings, and the shaft C being turned by the crank D to approach the knives, the hub $v$ of the crank D, coming in contact with the end O of the push-off, pushes it along in its bearings to its farthest limit, and the point $f$ of the crank D, striking the cam-lever F upon the part G, throws said cam-lever back, thereby allowing the notch $t$ on the lower side of the push-off to drop over the top edge of the bearing $a'$, preventing any backward movement of the push-off. The operation upon the apple being completed by the knives, the screw-shaft C is drawn back with the apple or core upon the fork E. Said apple or core, coming in contact with the end N of the push-off, by drawing back the shaft C, is forced or pushed off of the fork E. The lower side of the push-off M being curved, as shown at $w$, Fig. 2, the hub of the fork E, as the shaft C is drawn back, gradually raises up the push-off, so that by the time the apple or core is pushed off the fork E the notch $t$ will be disengaged from the edge of the bearing $a'$, allowing the push-off to be pushed back into its original position by placing another apple upon the fork E.

The operation of the other parts of my improved apple parer, corer, and slicer machine is as follows: The different parts of my machine taking the position shown by dotted lines, Fig. 1 of the drawings, by throwing back the cam-lever F the apple is placed upon the fork E, the shaft C being drawn back, so that the fork will be in the position shown by full lines, Fig. 1. The cam-lever F is then tripped, allowing the movable arms H and I to come into the position shown by full lines, Figs. 1 and 2, and at the same time the cam-lever engages with the thread of the shaft C, acting as a nut through which said shaft is turned. The crank D is then turned, causing the shaft C to be moved along and the apple to come in contact with the knives. When the operation of paring, coring, and slicing the apple is completed the point $f$ of the crank D, striking against the part G of the cam-lever F, throws back said cam-lever to its fullest extent, by which operation the movable arms or supports H and I are moved back into the position shown by dotted lines, Fig. 1, and the push-off M, which has been pushed along by the hub $v$ of the crank D turning shaft C, is dropped into position, the notch $t$ engaging with the upper edge of bearing $a'$ and preventing any backward longitudinal movement of the push-off, in the manner previously described. The shaft C, with the apple or core upon its fork E, is now drawn back toward the upright A. The cam-lever F having been disengaged from the thread of shaft C, allowing it free longitudinal motion in either direction, the apple or core is pushed off of the fork by the end N of the push-off M. A fresh apple is then placed upon the fork, pushing the push-off back into its original position, in the manner previously described. The shaft C is then pushed forward a short distance. During all this time the movable arms or supports H and I, with the knives thereon, are out of the way, in the position shown by dotted lines, Fig. 1. The cam-lever F is now tripped again, engaging with the thread of the shaft C and bringing the movable arms or supports back into position, ready for the knives to operate upon the apple, and the operation of paring, coring, and slicing the apple is repeated.

If it is desired to use my machine for paring apples alone, the adjustable corer and slicer knife K is dropped down out of the way, and the other parts of my machine are then operated in the same manner as above described.

I disclaim the invention described in the Letters Patent granted to C. Raymond Heizmann April 4, 1882, numbered 255,856.

Having described my improvements in apple parer, corer, and slicer machines, what I claim therein as new and of my invention, and desire to secure by Letters Patent, is—

1. The combination, in an apple-paring machine, of a slicer-knife, K, and curved corer L, with the hinged horizontal swinging arm or support I, said parts being constructed and arranged to operate with each other, substantially as and for the purposes set forth.

2. The combination, with the upright or standard A and hinged horizontal swinging or supporting arm H for supporting the paring-knife, of cam-lever F and threaded shaft C, said parts being arranged in relation to each other substantially as and for the purposes set forth.

3. The combination, with standard or upright A, of the horizontal swinging arms H and I, which support the paring-knife and the slicer-knife and corer, respectively, and cam-lever F, said parts being arranged to operate simultaneously to swing back the paring-knife and the slicer-knife and corer, for the ready removal of the core by the automatic push-off and the placing of a new apple upon the fork, all substantially as shown and described, and for the purposes set forth.

4. The combination, with standard or upright A and threaded shaft C, of the hinged horizontal supporting and swinging arm H, cam-lever F, and pin $e'$, substantially as described, and for the purposes set forth.

5. The combination, with standard or upright A and the fork-shaft C, of the automatic push-off M, mounted upon the top of bearings $a$ $a'$ upon the upper part of the upright A, and provided with a slot, $s$, and being cut away upon its lower side, so as to form a notch, $t$, for the purposes described, said parts being arranged and constructed substantially as described, and for the purposes set forth.

6. The combination, with the upright or standard A and hinged horizontal swinging or supporting arm H, of the pivoted knife-head J, provided with a weight or counterbalance-projection, $j$, all substantially as and for the purposes set forth.

CHAS. E. HUDSON.

Witnesses:
 JOHN C. DEWEY,
 EDWIN E. MOORE.